United States Patent [19]

Wood

[11] Patent Number: 4,546,663

[45] Date of Patent: Oct. 15, 1985

[54] DRIVE LINKAGE FOR STIRLING CYCLE AND OTHER MACHINES

[75] Inventor: James G. Wood, Athens, Ohio

[73] Assignee: Sunpower, Inc., Athens, Ohio

[21] Appl. No.: 506,313

[22] Filed: Jun. 21, 1983

[51] Int. Cl.[4] ............................................. F16H 21/32
[52] U.S. Cl. ........................................ 74/40; 60/520; 62/6; 74/44
[58] Field of Search ..................... 74/40, 43, 44, 45; 62/6; 60/520

[56] References Cited

U.S. PATENT DOCUMENTS

| | | | |
|---|---|---|---|
| 1,656,601 | 1/1928 | Novick | 74/40 |
| 2,035,222 | 3/1936 | Curtis | 74/40 |
| 2,653,484 | 9/1953 | Zecher | 74/40 |
| 2,830,455 | 4/1958 | Harmon | 74/40 |
| 3,482,457 | 12/1969 | Wallis | 74/44 |
| 3,964,523 | 6/1976 | Benedict | 74/40 |

Primary Examiner—Ronald C. Capossela
Attorney, Agent, or Firm—Frank H. Foster

[57] ABSTRACT

An improved linkage which is advantageously used in linking the crank of a Stirling machine to its coaxially reciprocating pistons. A swing lever having at least three spaced pivot axes is connected at one of its pivot axes to the machine housing and at a second pivot axes to one of the pistons. A bell crank, also having at least three pivot axes which are triangularly arranged, is rotatably connected at one of its pivot axes to the crank throw pin and pivotally connected at a second one of its pivot axes to the other piston. The bell crank is pivotally connected at its third pivot axis to the third pivot axis of the swing lever.

12 Claims, 13 Drawing Figures $E = \sqrt{A^2 + B^2}$ $RO = \tan^{-1}(A/B)$ $\alpha = RO + 90°$ $S = \sqrt{E^2 + R^2 - 2ER \cos(\alpha + \theta_2)}$ $\beta = \sin^{-1}\left(\dfrac{R}{S} \sin(\alpha + \theta_2)\right)$ $\psi = \cos^{-1}\left(\dfrac{C^2 + S^2 - D^2}{2SC}\right)$ $\lambda = \sin^{-1}\left(\dfrac{C}{D} \sin \psi\right)$ $\theta_4 = 90° - RO - \beta - \lambda$ $\theta_3 = 90° + \psi - RO - \beta$ $Y_1 = RL \sin \theta_4$ $X_1 = RL (1 - \cos \theta_4)$ $Y_2 = D \sin \theta_4 + F \sin(\theta_3 - Y)$ $X_2 = D (1 - \cos \theta_4) + F(1 - \cos(\theta_3 - Y))$

FIG. 3

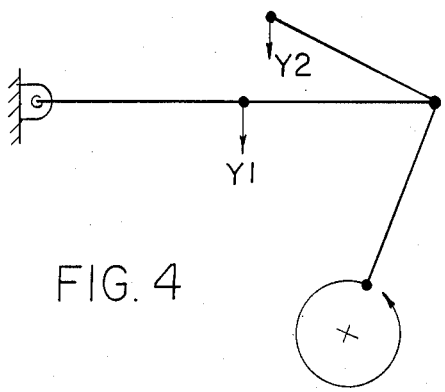

FIG. 4

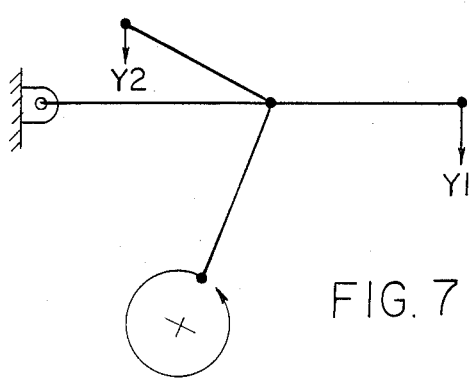

FIG. 7

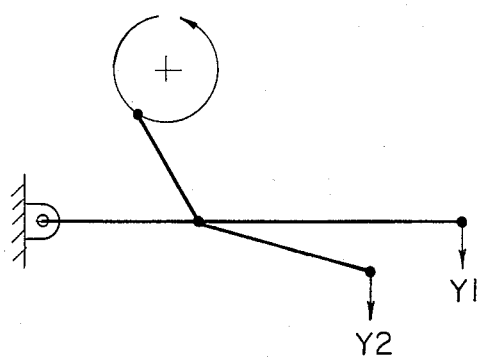

FIG. 5

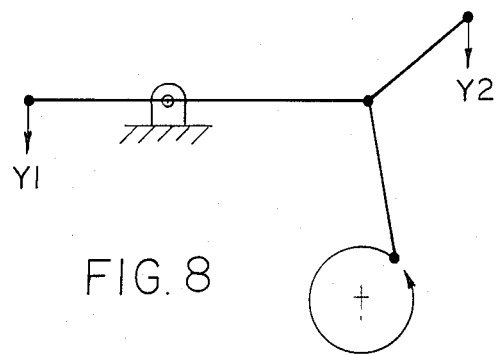

FIG. 8

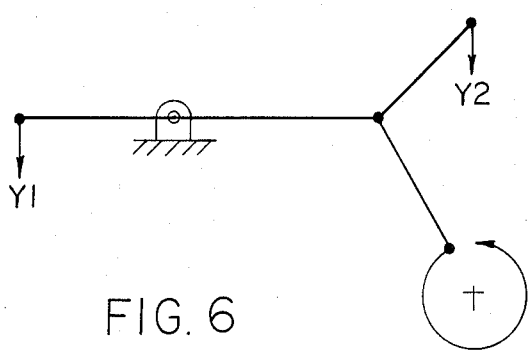

FIG. 6

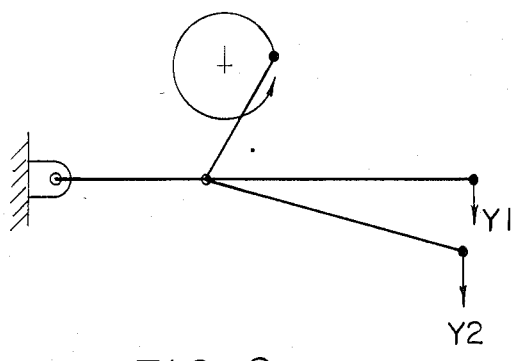

FIG. 9

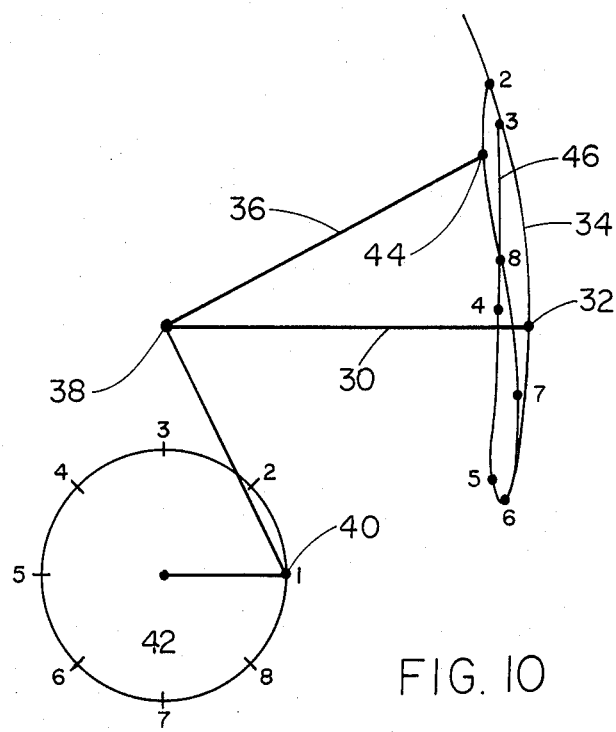
FIG. 10
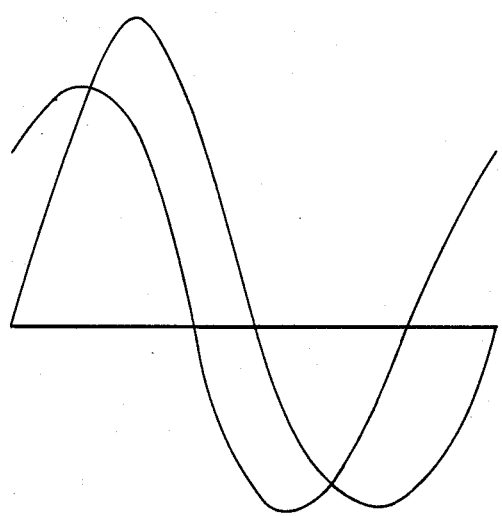
FIG. 11
A = 6     R = 2
B = 4     F = 6
C = 4.472 RL = 12
D = 6     Y = 1.4
FIG. 12
A = 6.6   R = 2
B = 4     F = 6
C = 4.472 RL = 12
D = 6     Y = 1.2
FIG. 13
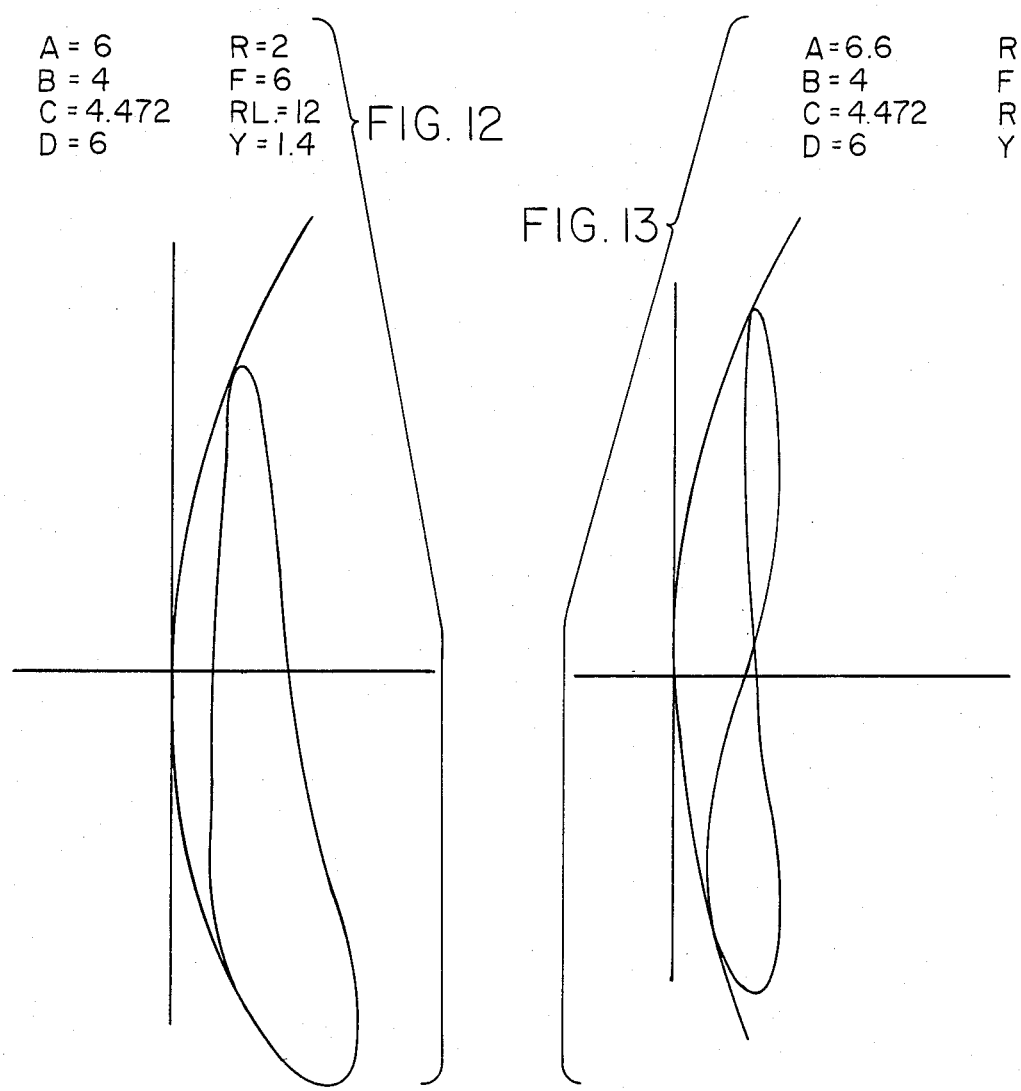

DRIVE LINKAGE FOR STIRLING CYCLE AND OTHER MACHINES

FIELD OF THE INVENTION

This invention relates generally to a mechanical linkage mechanism for drivingly linking a rotating body to a pair of reciprocating bodies and more particularly relates to such a drive mechanism which is most advantageously used in Stirling engines, particularly of the single cylinder type.

BACKGROUND OF THE INVENTION

Stirling engines which are not of the free piston type require a mechanism which links a crankshaft to the reciprocating power piston and displacer piston. Conventional connecting rods have long been used which directly connect the crank throw pin to the wrist pin of the reciprocating pistons.

While such a conventional linking mechanism provides the proper relative phasing between the power piston and the displacer piston, it also applies major side loads to these pistons. Major side loading occurs because the motion of the crank throw pin is circular and therefore its component of motion which is coaxial with the pistons is equal to its component of motion which is perpendicular to the axis of the pistons.

Others have suggested linking mechanisms for connecting the rotating crank to the reciprocating power and displacer pistons. While such mechanisms reduce side loads, they are complicated and require a significant number of links and/or bearings.

There is therefore a need for, and it is an object of the present invention to provide, a linking mechanism which can maintain the proper phase relationship between two reciprocating bodies, such as the pistons of a Stirling machine, while providing side forces which are substantially less than those applied by a conventional crank and connecting rod mechanism and yet which is a relatively simple mechanism in that it requires relatively few links and bearings compared to the number of links and bearings required by other mechanisms used for a similar purpose.

BRIEF SUMMARY OF THE INVENTION

The invention comprises a swing lever having at least three spaced pivot axes and a bell crank also having at least three spaced pivot axes. The swing lever is pivotally connected at one of its pivot axes to ground and pivotally connected at another of its pivot axes to one of two reciprocating bodies. The bell crank is rotatably connected at one of its pivot axes to the crank throw pin of a rotating crank and pivotally connected at a second one of its pivot axes to the other of the two reciprocating bodies. The bell crank is pivotally connected at its third pivot axis to the third pivot axis of the swing lever.
dr

BRIEF DESCRIPTION OF THE DRAWINGS

FIG. 3 is the equations defining the relationships between the mathematical parameters illustrated in FIG. 2.

FIGS. 4–9 are diagrams illustrating alternative embodiments of the invention.

FIG. 10 is a diagram and graph illustrating the motion of an embodiment of the invention.

FIG. 11 is a graph representing the relative motions with respect to time of a displacer piston and a power piston connected to the embodiment illustrated in FIG. 10.

FIGS. 12 and 13 are diagrams illustrating the motion of alternative embodiments of the invention.

Figure 1:
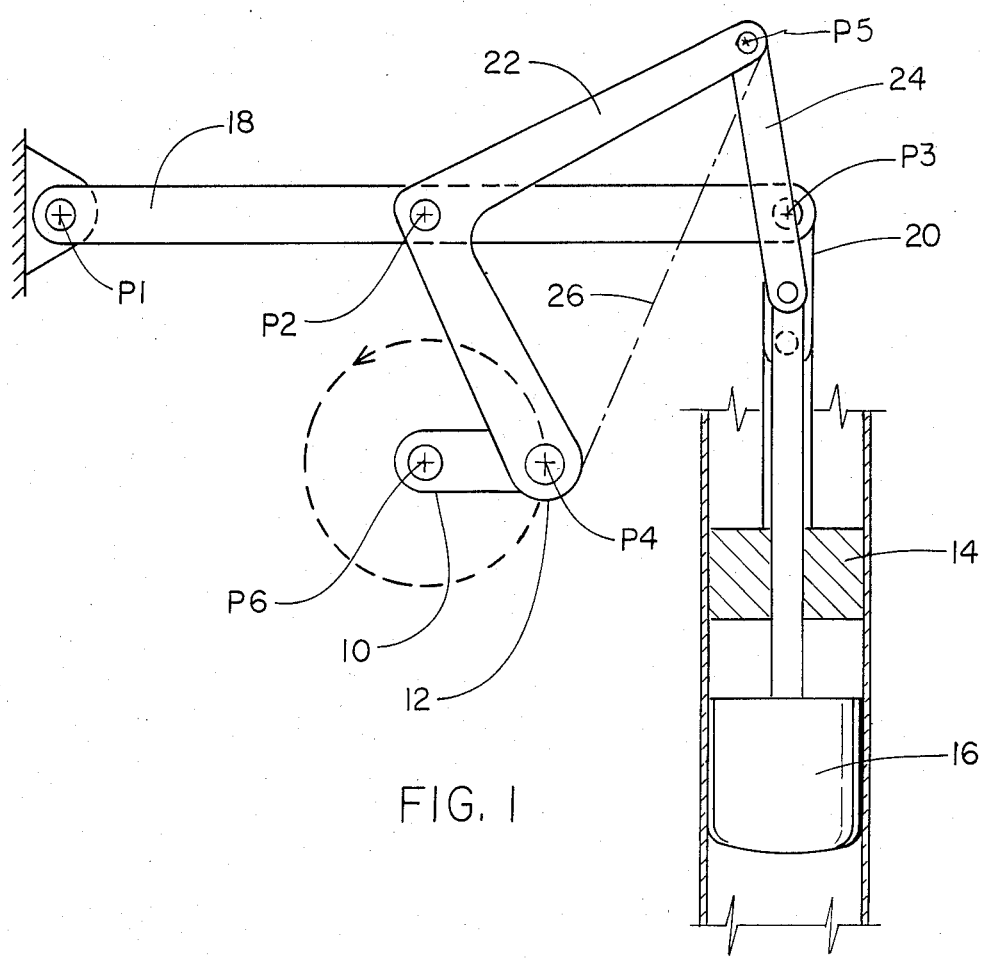
FIG. 1 is a diagram illustrating the connection of an embodiment of the invention to a single cylinder Stirling engine.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

FIG. 1 illustrates a rotating crank 10 having a crank throw pin 12 moving in a circular path about the axis of rotation P6 of the crank 10. The crank 10 is drivingly linked to a reciprocating power piston 14 and a coaxially reciprocating displacer piston 16 through a linkage mechanism embodying the present invention.

A swing lever 18 has three spaced pivot axes P1, P2 and P3. Axis P1 is pivoted to ground, as schematically illustrated, and axis P3 is pivotally connected to the reciprocating power piston 14 through an intermediate, dual-pivot, connecting link 20. A bell crank 22 is pivotally connected to the swing lever 18 through its pivot axis P2 which is coaxial with the same pivot axis on the swing lever 18. The bell crank 22 has two other pivot axes P4 and P5 arranged so that its three pivot axes are apices of a triangle. The bell crank 22 is pivotally connected at its pivot axis P4 to the crank throw pin 12 and is pivotally connected at its pivot axis P5 to the displacer 16 through an intermediate, dual-pivot, connecting link 24. The dual-pivot connecting link 24 may be any simple connecting link for linking the linear component of motion of one body to another body. For example, a flexural link may also be used as the simple connecting link.

It will be apparent to those skilled in the art that the actual shape of the swing lever 18 and the bell crank 22 are of little significance so long as they don't interfere with other mechanisms and their mass is not too great. The matter of significant importance is the relative positioning and spacing of the pivot axes. Thus, for example, the bell crank 22 may in fact be a triangular link extended so that it is bounded by a side 26 illustrated in phantom.

Figure 2:
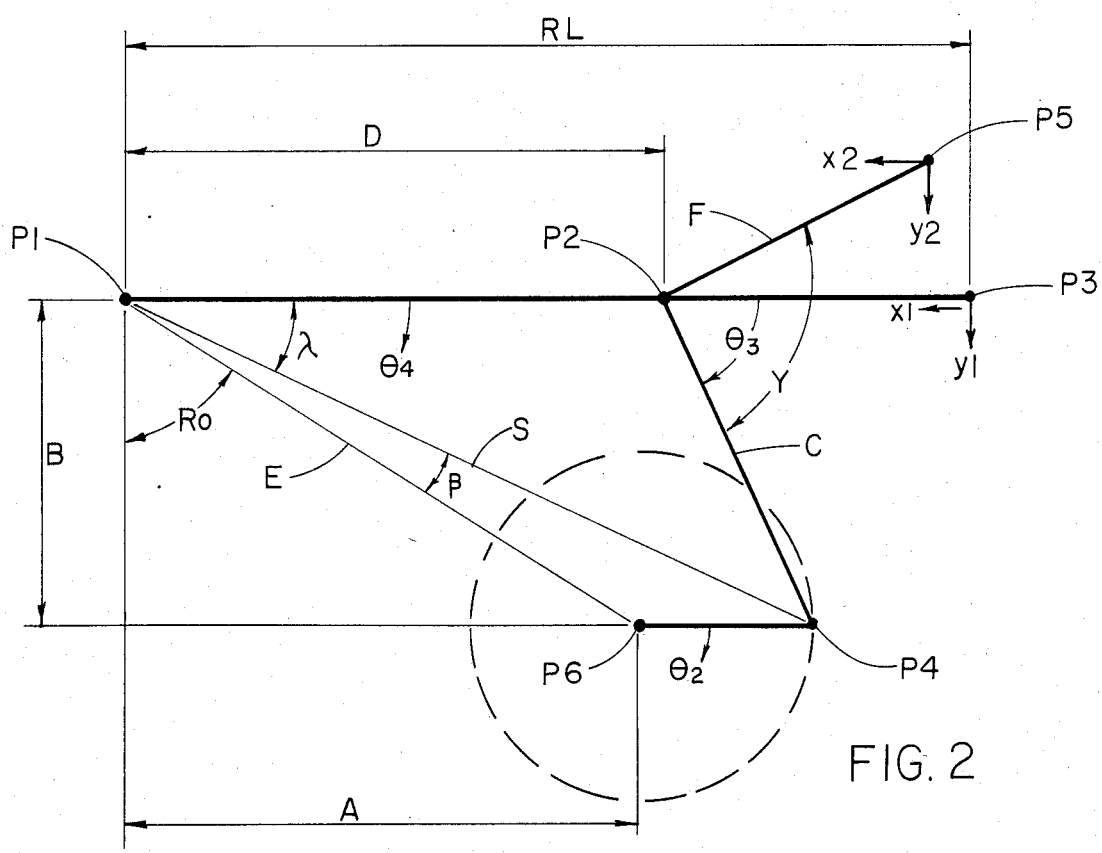
FIG. 2 is a diagram illustrating the mathematical parameters describing the embodiment of FIG. 1.

FIG. 2 illustrates the parameters of embodiments of the invention which may be varied in order to modify the operating characteristics of embodiments of the invention.

FIG. 3 illustrates the mathematical equations describing and relating the parameters illustrated in FIG. 2.

A variety of alternative embodiments of the invention are possible by interchanging the relative positions of the three pivots of the swing link and the bell crank. Thus, for example, as illustrated in FIGS. 6 and 8, the swing lever pivot axis which is connected to ground may be interposed between the other two pivot axes on the swing lever. Similarly, the coaxial pivot axes which interconnect the swing lever and the bell crank may include either the end or the intermediate pivot axes of the swing lever as well as any of the three pivot axes on the bell crank.

Further, as illustrated for example in comparing FIGS. 7 and 9, the two pivot axes of the bell crank which are not connected at a pivot axis of the swing lever may be positioned either on the ground side or the opposite side of the pivot axis on the swing lever to which the bell crank is connected.

Additionally, the crank may be rotatably mounted on the same side of the swing lever as the reciprocating bodies as illustrated in FIGS. 1 and 4, for example, or preferably in some designs the crank is on the opposite side of the swing lever from the reciprocating bodies. This latter design is more flexible because the bell crank and the crank throw are not constrained by the close proximity of the cylinder and the need to clear it.

In some instances it is desirable, as an alternative embodiment of the invention, to provide a slight bend or crook in the swing lever so that the three pivot axes of the swing lever are not colinear. This changes the mean lines of action of the mechanism and enables the design of a mechanism in which the mean lines of action of the swing lever and of the bell crank are substantially parallel.

Embodiments of the invention are particularly advantageously used with two reciprocating bodies, such as the pistons of a Stirling engine, which reciprocate in the same cylinder or otherwise reciprocate coaxially. With such reciprocating bodies it is desirable that the swing lever and the bell crank be designed with the appropricate spacing between their pivot axes so that the pivot axes which are connected to reciprocating bodies travel along intersecting paths. These paths are diagrammatically intersecting but actually travelling in parallel planes only appearing to intersect on a diagram.

This is most easily accomplished, as illustrated in FIG. 1, by making the spacing between pivot axis P2 and pivot axis P5 identical to the spacing between pivot axis P2 and pivot axis P3.

Operation of the embodiments of the invention is illustrated in FIGS. 10 through 13. In FIG. 10 the swing lever 30 pivots about a pivot axis (not illustrated) so that its pivot axis 32 travels in an arcuate path 34. The bell crank 36 is connected to the swing lever 30 at pivot axis 38 and is connected to the crank throw pin at its pivot axis 40. As the crank 42 rotates to move the crank throw pin 40 along its circular path, the pivot axis 44 of the bell crank 36 travels in an elongated "figure eight" path 46.

FIG. 10 shows that the components of motion of the pivot axes 32 and 44 are considerably greater in the vertical direction of FIG. 10 than in the horizontal direction of FIG. 10. Thus, the vertical component of motion of the swing lever pivot 32, which is connected to one reciprocating body, may be termed Y1 while its horizontal component of motion may be identified as X1. Similarly, the vertical component of motion of the pivot axis 44 of the bell crank 36, which is connected to the other reciprocating body, may be designated Y2 while the horizontal component of its motion may be designated X2.

Thus, as referred to in the Background Of The Invention, it can be seen that the Y components of motion of the pivot axes 32 and 44 are substantially greater than the X components of motion of those pivot axes. In contrast, the X and Y components of the motion of pivot axis 40 on the crank 42 are equal. Because the X components of motion of the pivot axes 32 and 44 are substantially reduced relative to the Y components of motion, the side loading applied to each reciprocating body is substantially reduced. The minor remaining transverse component of motion X2 and Y2 of both pivot axes is eliminated by the use of simple connecting links such as 20 and 24 illustrated in FIG. 1.

FIG. 11 illustrates the Y components of motion of the pivot axes 32 and 44 as a function of time. Although the motions are not perfectly sinusoidal nor of equal stroke nor symmetrical, they are approximately sinusoidal and maintain the desired phase relationship with respect to each other as is desirable with a Stirling machine.

The paths of motion of the two pivot axes which are connected to the reciprocating bodies may be made more nearly overlying by increasing the angle, identified as Y in FIG. 2, between the lines joining the pivot axes of the bell crank.

FIGS. 12 and 13 illustrate, in the manner of FIG. 10, the motion of the two pivot axes which are connected to the reciprocating bodies in two different embodiments of the present invention having parameters defined in those figures.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. A mechanical linkage for drivingly linking a body which is rotating with respect to a selected ground to a pair of bodies which are reciprocating with respect to said ground, said linkage comprising:
   (a) a crank means connected to said rotating body and including a crank throw pin which moves in a circular path about the axis of rotation of said rotating body;
   (b) a swing lever having at least 3 spaced pivot axes, said swing lever pivotally connected at a first one of its pivot axes to said ground and pivotally connected at a second one of its pivot axes to one of said reciprocating bodies; and
   (c) a bell crank having at least 3 pivot axes arranged as apices of a triangle, said bell crank rotatably connected at a first one of its pivot axes to said crank throw pin, pivotally connected at a second one of its pivot axes to the other of said reciprocating bodies and pivotally connected at the third one of its pivot axes to the third pivot axis and said swing lever.

2. A linkage in accordance with claim 1 wherein said reciprocating bodies are linearly reciprocative and are each connected to said linkage by means of simple connecting links.

3. A linkage in accordance with claim 1 wherein said swing lever is pivoted to ground at one end and to a reciprocating body at its opposite end and the bell crank pivot axis which is connected to the other reciprocating body is positioned further from said ground than the pivot axis at which said swing lever is connected to said bell crank.

4. A linkage in accordance with claim 3 wherein said reciprocating bodies are positioned on one side of said swing lever and said crank means is positioned on the opposite side of said swing lever.

5. A linkage in accordance with claim 4 wherein said reciprocating bodies are linearly reciprocative and are each connected to said linkage by means of simple connecting links.

6. A linkage in accordance with claim 5 wherein said reciprocating bodies are the coaxially reciprocating power piston and displacer piston of a Stirling machine.

7. An improved crank type Stirling machine of the type including a crank having a crank throw pin and rotatably mounted in a housing and a power piston and a displacer piston mounted for linear reciprocation wherein the improvement comprises a mechanical linkage for linking said pistons to said crank and comprising:
   (a) a swing lever having at least three spaced pivot axes, pivotally connected at a first one of its pivot axes to said housing and pivotally connected at a second one of its pivot axes to one of said pistons;
   (b) a bell crank having at least three spaced pivot axes arranged as apices of a triangle and rotatably connected at a first one of its pivot axes to said crank throw pin, pivotally connected at a second one of its pivot axes to the other piston and pivotally connected at the third one of its pivot axes to the third pivot axis of said swing lever.

8. A Stirling machine in accordance with claim 7 wherein said swing lever and said bell crank are each connected to their respective pistons by a simple connecting link.

9. A Stirling machine in accordance with claim 8 wherein said pistons reciprocate coaxially.

10. A Stirling machine in accordance with claim 9 wherein said swing lever is pivoted to ground at one end, wherein it is pivoted to said bell crank at its intermediate pivot axis and wherein the distance between the pivot axis at which the swing link is connected to the bell crank and the pivot axis at which each is connected to a piston are substantially identical.

11. A Stirling machine in accordance with claim 10 wherein said bell crank is connected to the power piston and the swing lever is connected to the displacer piston.

12. A Stirling machine in accordance with claim 9 wherein said crank is positioned on the opposite side of said swing lever from said pistons.

* * * * *